United States Patent [19]

Payrhammer et al.

[11] Patent Number: 4,523,839
[45] Date of Patent: Jun. 18, 1985

[54] METHOD AND ARRANGEMENT FOR EVALUATING A SERIES OF ORIGINALS FOR COPYING

[75] Inventors: Bernd Payrhammer; Bernhard Knör, both of Munich, Fed. Rep. of Germany

[73] Assignee: Agfa-Gevaert Aktiengesellschaft, Leverkusen, Fed. Rep. of Germany

[21] Appl. No.: 466,976

[22] Filed: Feb. 16, 1983

[30] Foreign Application Priority Data

Feb. 18, 1982 [DE] Fed. Rep. of Germany ....... 3205898

[51] Int. Cl.³ ...................... G03B 27/74; G03B 27/80
[52] U.S. Cl. ......................................... 355/68; 355/77
[58] Field of Search ................ 355/68, 38, 77, 18, 355/41; 356/444; 250/559–561, 571

[56] References Cited

U.S. PATENT DOCUMENTS

| | | | |
|---|---|---|---|
| 3,469,480 | 9/1969 | Nassenstein et al. | 83/50 |
| 3,584,224 | 6/1971 | Harlem | 250/561 |
| 3,981,579 | 9/1976 | Weinert et al. | 355/18 |
| 4,167,678 | 9/1979 | Mischo et al. | 250/559 |

FOREIGN PATENT DOCUMENTS 8000613 4/1980 World Intel. Prop. Org. ...... 355/41

Primary Examiner—L. T. Hix
Assistant Examiner—Della J. Rutledge
Attorney, Agent, or Firm—Peter K. Kontler

[57] ABSTRACT

An exposed and developed film strip having a series of frames is conveyed by a copying station via a pair of rolls driven by a motor. Two or more photoelectric sensors upstream of the copying station generate signals indicative of the transparency of the film strip. The sensors are located on a reference line which extends normal to the longitudinal direction of the film strip. The signals from the sensors are processed to yield processed signals which are representative of significant transparency changes. The processed signals are evaluated to determine the definition of each frame and thereby determine whether a frame is worth copying. In order to locate the frames, the processed signals derived from each sensor are delivered to a common AND gate. The gate emits a pulse when processed signals from all sensors arrive at the gate simultaneously. This is a strong indication that an edge of a frame is in register with the reference line on which the sensors are located. The presence of an edge may be verified by comparing the known length of a frame, or the known distance of separation between neighboring frames, with the distance travelled by the film strip during the time interval between detection of consecutive edges. The motor which advances the film strip is controlled in dependence upon the results of the evaluation of the processed signals and in dependence upon the pulses emitted by the AND gate.

41 Claims, 3 Drawing Figures

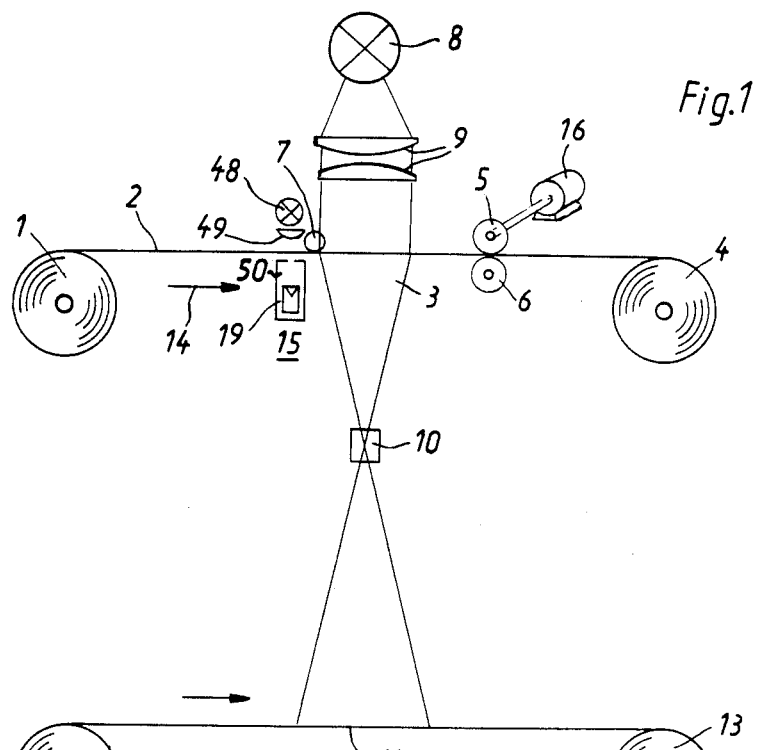
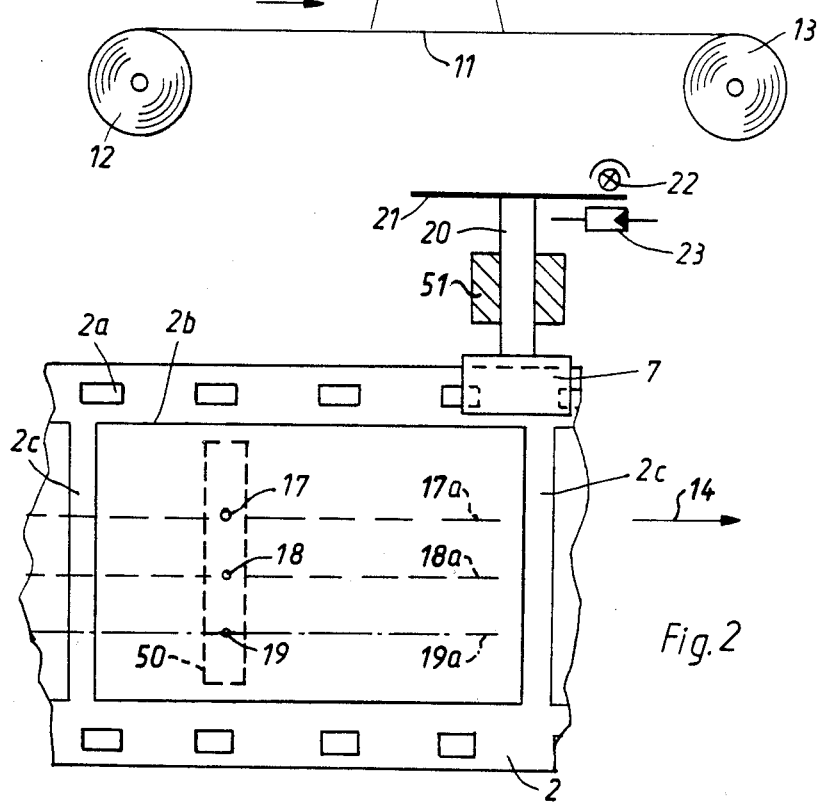
Fig.1
Fig.2

METHOD AND ARRANGEMENT FOR EVALUATING A SERIES OF ORIGINALS FOR COPYING

BACKGROUND OF THE INVENTION

The invention relates generally to a method of and an arrangement for evaluating a series of originals prior to copying.

More particularly, the invention relates to a method of and an arrangement for determining the definition of a series of originals prior to copying. Such a series of originals may, for example, constitute discrete frames on a strip of film.

In a known method of evaluating a strip of film prior to copying, the transparencies of neighboring regions of the originals or frames are photoelectrically determined. The sizes of these regions correspond to the resolution of the film. The transparency values are processed to generate differential values which are a function of the transparency differences of adjacent regions. The differential values are compared with reference values. The number and/or magnitudes of the differential values which exceed the reference values are evaluated to obtain an indication of the definition of each original.

The German Offenlegungsschrift No. 2 244 340 which corresponds to U.S. Pat. No. 3,981,579, discloses a copier for copying rolls of film. An inspection station for determining the definition of the originals is located upstream of the copying station. The originals or negatives are photoelectrically scanned in the inspection station in order to determine whether or not they are worth copying. If an original is found to be acceptable for copying, it is transported into the copying station and copied. On the other hand, originals which are found to lack sufficient definition for copying are transported through the copying station without being copied.

Only films having marks such as notches or perforations for indicating the locations of the originals can be processed in the above copier. Certain film manufacturers provide these marks on the unexposed film and the marks are than used to properly position the frames or originals in a camera during exposure. Marks of this type are not provided on 135 mm. film, that is, the so-called miniature film. Accordingly, the film must be provided with marks after development in order that it may be copied in the above copier.

A method of marking an exposed film is taught in the German Pat. No. 1 285 317 corresponding to U.S. Pat. No. 3,469,480. This patent makes use of the fact that a detectable change in transparency usually occurs at the boundary of a film frame. The frames are photoelectrically scanned and the transparency values obtained in this manner are used to locate the boundaries of the film frames and hence the film frames themselves. The edges of the film are then provided with notches which identify the locations of the film frames.

U.S. Pat. No. 4,167,678 recognizes that it is not always possible to photoelectrically detect the boundaries of overexposed or underexposed film frames. The U.S. patent thus proposes to photoelectrically detect opposed boundaries of at least one film frame where appreciable changes in transparency occur at the boundaries. The length of the frame is determined from the results of the photoelectric scan and is used as a yardstick to identify the locations of film frames where the boundaries cannot be detected photoelectrically. This makes it possible to provide the film with notches even for those frames which do not lend themselves to photoelectric detection.

In both the German patent and the last-mentioned U.S. patent, a separate arrangement as well as an additional operation are required in order to photoelectrically detect the film frames and to provide the film with corresponding notches.

OBJECTS AND SUMMARY OF THE INVENTION

It is an object of the invention to provide a more efficient method for evaluating originals prior to copying.

Another object of the invention is to provide a more rapid method for evaluating originals prior to copying.

An additional object of the invention is to provide a method of evaluating originals prior to copying which permits the position of an original and the quality of the original for copying to be determined at the same station.

A concomitant object of the invention is to provide an arrangement which enables an evaluation of originals prior to copying to be performed more efficiently than heretofore.

It is also an object of the invention to provide an arrangement which enables an evaluation of originals prior to copying to be performed more rapidly than heretofore.

Still another object of the invention is to provide an arrangement which enables the position of an original and the quality of the original for copying to be performed in the same station.

The preceding objects, as well as others which will become apparent as the description proceeds, are achieved by the invention.

One aspect of the invention resides in a method of evaluating a series of originals prior to reproduction. The originals may, for example, constitute discrete frames on a strip or web of film. Each of the originals has a pair of substantially parallel edges and the originals are arranged so that the edges extend in substantial parallelism with one another. The method involves the following steps:

A. Measuring the transparencies of a series of regions of each original along at least two scanning lines which extend transversely of the edges of the originals. Preferably, the size of each region is substantially equal to the resolution of the original. It is further preferred for the scanning lines to be parallel to one another and normal to the edges of the originals. In a strip of film, neighboring originals or frames are generally separated by strip-shaped areas and the scanning lines are then preferably normal to these areas. The measuring step is advantageously performed photoelectrically.

B. Deriving change values representative of significant transparency differences between neighboring regions from the transparency values obtained during the measuring step. The change values include first change values derived from one of the scanning lines and second change values derived from the other of the scanning lines. Preferably, the change values are derived by processing the transparency values to obtain differential values which are a function of the transparency differences between neighboring regions and then comparing the differential values with reference values.

C. Evaluating the change values to establish the quality of each original for reproduction. The evaluating step is preferably carried out by determining the number and/or magnitudes of the change values, that is, by determining the number and/or magnitudes of the differential values which exceed the reference values. The number and/or magnitudes of the change values are used as indicators of the definition of an original.

D. Generating a signal when first and second change values are substantially simultaneously derived from respective locations of the scanning lines situated on a common reference line substantially paralleling the edges of the originals. Such signal indicates a substantial probability of one of the edges being substantially in register with the reference line.

Another aspect of the invention resides in an arrangement for evaluating a series of originals, particularly a series of frames on a strip or web of film, prior to reproduction. As before, each of the originals has a pair of substantially parallel edges and the originals are arranged so that all of the edges extend in substantial parallelism with one another. The arrangement comprises the following:

A. Transparency measuring means for measuring the transparencies of a series of regions of each original along at least two scanning lines which extend transversely of the edges of the originals. The transparency measuring means includes a first measuring device for one of the scanning and a second measuring device for the other of the scanning lines. The measuring devices are located on a common reference line which substantially parallels the edges of the originals. It is preferred for the measuring devices to be in the form of photoelectric sensors which are designed to sense regions having a size substantially equal to the resolution of the originals. The scanning lines are preferably parallel to one another and normal to the edges of the originals. When the originals are frames on a strip of film which are separated from one another by strip-shaped areas of the film, the scanning lines are preferably normal to such strip-shaped areas.

B. Deriving means connected with the transparency measuring means for converting the transparency values generated by the latter into change values representative of significant transparency differences between neighboring regions of the originals. The deriving means is designed to derive first change values from the transparency values generated by the first measuring device and second change values from the transparency values generated by the second measuring device. The deriving means preferably includes a first deriving unit which is connected with the first measuring device and a second deriving unit which is connected with the second measuring device. It is further preferred for each deriving unit to include a first device for generating differential values which are a function of the transparency differences between neighboring regions of the originals and a second device for comparing the differential values with reference values.

C. Evaluating means connected with the deriving means and designed to evaluate the change values to thereby establish the quality of each original for reproduction. Preferably, the evaluating means includes an evaluating unit for counting the change values and/or establishing the magnitudes of the change values, i.e. for counting the number of differential values which exceed the reference values and/or establishing the magnitudes of the differential values which exceed the reference values. The number and/or magnitudes of the change values are then used as indices to determine whether an original is worthy of reproduction.

D. Generating means connected with the deriving means and designed to generate a signal when first and second change values are substantially simultaneously derived from the first and second measuring devices. The signal indicates a substantial probability of an edge of an original being in substantial register with the reference line. The first and second change values may respectively include first positive and second positive change values which are representative of transparency increases as well as first negative and second negative change values which are representative of transparency decreases. In such an event, the generating means preferably includes a first generating device for generating a signal when first positive and second positive change values are substantially simultaneously derived from the first and second measuring devices, and a second generating unit for generating a signal when first negative and second negative change values are substantially simultaneously derived from the first and second measuring devices.

The arrangement may further comprise moving means for moving the originals and the transparency measuring means relative to one another longitudinally of the scanning lines. It is preferred that such moving means be designed to convey the originals. If the originals constitute frames on a strip of film, the moving means then conveys the strip in its longitudinal direction.

The arrangement may additionally include distance measuring means for measuring the relative distance of movement of the originals and the transparency measuring means during a predetermined time interval.

In accordance with the invention, the transparency values used to evaluate the quality of an original for reproduction, e.g. to determine the definition of an original, are further used to generate change values representative of the transparency differences between neighboring regions of the original. Furthermore, the change values are obtained along at least two scanning lines which extend transversely of the edges of the originals, e.g. which extend parallel to the direction of movement of a strip of film containing a series of frames and transported longitudinally during scanning. This makes it possible to determine the boundaries of the originals at the same station where the quality of the originals for reproduction is evaluated. Relatively little additional expense for electronic processing of the transparency values is required in order to locate the boundaries of an original. A signal is generated to indicate the presence of a boundary and such signal may be used to control transport of an original worth reproducing into a copying station and/or a marking station, i.e. a station where a strip of film, for example, is provided with notches or perforations indentifying the locations of the frames constituting the originals.

The novel features which are considered as characteristic of the invention are set forth in particular in the appended claims. The improved evaluating arrangement itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWINGS

FIG. 1 schematically illustrates the principal components of a copier which is designed to copy rolls of film and includes a unit for evaluating the definition and detecting the boundaries of the frames;

FIG. 2 illustrates certain details of the evaluating and detecting unit of FIG. 1.

DESCRIPTION OF THE PREFERRED EMBODIMENTS

Figure 3:
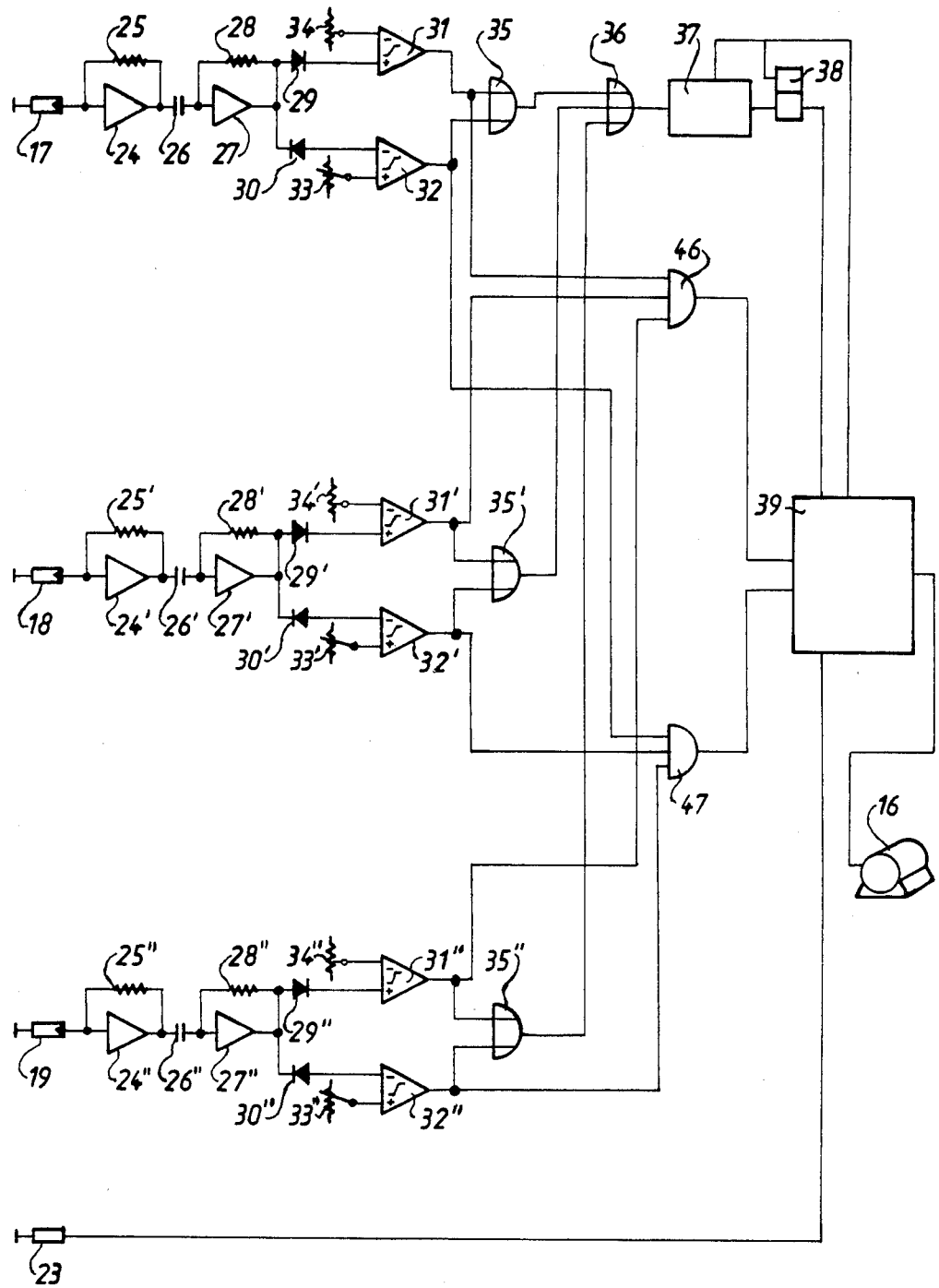
FIG. 3 illustrates the principal components of a circuit for the evaluating and detecting unit of FIG. 1.

FIG. 1 shows the principal components of a copier for copying rolls of film. A strip or web 2 of exposed and developed film, e.g. 135 mm. film, is transferred from a take-off reel 1 to a take-up reel 4. The film strip 2 is transported from the reel 1 to the reel 4 by a pair of rolls 5 and 6 of which at least one is driven by a motor 16. The motor 16 is regulated by the circuit which is shown in FIG. 3 and is to be described later.

With reference to FIG. 2, the film strip 1 includes a series of frames or negatives 2b constituting originals to be copied. Neighboring ones of the frames 2b are separated by strip-shaped portions 2c of the film strip 2. The strip-shaped portions 2c extend normal to the longitudinal direction of the film strip 2 and define boundaries or edges for the frames 2b which likewise extend normal to the longitudinal direction of the film strip 2. The film strip 2 is provided with perforations 2a in the regions of its longitudinal sides. The perforations 2a are adapted to be engaged by sprocket wheels or the like to thereby permit the film strip 2 to be advanced in a camera.

Referring once more to FIG. 1, the copier has a copying window 3 and the film strip 2 is transported by the window 3 during transfer from the reel 1 to the reel 4. A light source 8 is located above the window 3 and a condensing lens system 9 is situated between the light source 8 and the window 3. The light source 8 illuminates a frame 2b which is superimposed with the window 3 thereby causing an image of such frame 2b to be formed on a band 11 of light-sensitive copying material. The image of a frame 2b which is superimposed with the window 3 is focused on the band 11 via an objective lens 10. The band 11 is transferred from a take-off reel 12 to a take-up reel 13 in synchronism with the film strip 2.

The direction of movement of the film strip 2 is indicated by the arrow 14. Upstream of the copying window 3 as considered in the direction 14 is a photoelectric sensing arrangement 15. As shown in FIG. 2, the sensing arrangement 15 includes three photoelectric sensors or transducers 17, 18 and 19 which are arranged in a row extending normal to the direction of movement 14 of the film strip 2. The row formed by the sensors 17–19 extends parallel to the strip-shaped portions 2c of the film strip 2 and to the edges of the frames 2b defined by the strip-shaped portions 2c.

As shown in FIG. 1, the sensors 17–19 are located opposite and on the other side of the film strip 2 from a light source 48 and a condensing lens 49. The sensors 17–19 have apertures which receive light from the light source 48. The amount of light received by the sensors 17–19 from the light source 48 is indicative of the transparency of the film strip 2.

The effective cross sections of the apertures in the sensors 17–19 are very small. Preferably, the effective cross sections of the apertures are of the order of the resolution of the frames 2b. By way of example, the apertures of the sensors 17–19 may have a diameter of 0.2 mm. One manner of reliably ensuring that the effective cross sections of the apertures in the sensors 17–19 are very small is to provide a guide 50 for the film strip 2 and to form openings of the desired cross sections in the guide 50. By arranging the sensors 17–19 relative to the guide 50 as illustrated in FIG. 2, the apertures in the sensors 17–19 will have the desired effective cross sections. Another manner of reliably ensuring that the apertures in the sensors 17–19 have very small effective cross sections is to form openings having the desired cross sections in a focusing device or focusing devices for the light transmitted to the sensors 17–19.

With reference still to FIGS. 1 and 2, a distance measuring unit for measuring the distance travelled by the film strip 2 is also located upstream of the window 3 as considered in the direction of movement 14 of the film strip 2. The distance measuring unit includes a shaft 20 which is rotatably mounted in a support 51. One end of the shaft 20 carries a roll 7 which presses against the film strip 2. The other end of the shaft 20 carries a disk 21 which is provided with a series of circumferentially spaced openings. A light source 22 is located on one side of the disk 21 while a photoelectric detector is arranged on the opposite side of the disk 21. The detector 23 is in register with the light source 22 and generates an electrical pulse whenever an opening in the disk 21 is aligned with the light source 22 and the detector 23. In this manner, the angular displacement of the disk 21, and hence of the roll 7, may be measured. The angular displacement may, in turn, be converted into the distance travelled by the film strip 2.

The motor 16 which causes advancement of the film strip 2 in the direction 14 is regulated by the sensors 17–19 as well as the detector 23. FIG. 3 depicts the principal components of the circuit which connects the motor 16 to the sensors 17–19 and the detector 23.

The sensors 17–19 are connected to the motor 16 via respective circuit arrangements which are virtually identical to one another. Components having the same function and repeated in each of the three circuit arrangements are identified by the same reference numerals. However, the components corresponding to the sensor 17 are unprimed, the components corresponding to the sensor 18 are single-primed and the components corresponding to the sensor 19 are double-primed. The circuit arrangement for the sensor 17 is described below in detail and it will be understood that this description also applies to the circuit arrangements for the sensors 18 and 19.

One end of the sensor 17 is connected to ground while the other end is connected to an amplifier 24. A feedback circuit is provided for the amplifier 24 and includes a resistor 25. The amplifier 24 thus operates as a linear amplifier. The resistor 25 may be replaced by a diode thereby causing the amplifier 24 to operate as a logarithmic amplifier. The signal emitted by the amplifier 24 will then represent the reciprocal of the density and not the transparency.

The output of the amplifier 24 is connected to one side of a capacitor 26 which functions as a differentiating element. The other side of the capacitor 26 is connected to a second amplifier 27 having a feedback circuit which includes a second resistor 28. The output of the amplifier 27 is connected with a pair of rectifying elements which are here in the form of diodes 29 and 30. The diodes 29 and 30 are connected in parallel but are arranged so that the respective polarities are reversed. The diode 29 is connected to one input of a comparator amplifier 31. The other input of the amplifier 31 is connected to a potentiometer 34 which delivers an adjustable reference signal or voltage to the amplifier 31. The diode 30 is similarly connected to one input of a comparator amplifier 32. The other input of the amplifier 32 is connected to a potentiometer 33 which again delivers an adjustable reference signal or voltage to the amplifier 32.

The output of the amplifier 31 is connected to one input of an OR gate 35 having two inputs. The second input of the OR gate 35 is connected with the output of the amplifier 32. The output of the OR gate 35 is connected with one of the inputs of a second OR gate 36 having a total of three inputs. The remaining two inputs of the OR gate 36 are respectively connected to the OR gate 35' corresponding to the circuit arrangement for the sensor 18 and the OR gate 35" corresponding to the circuit arrangement for the sensor 19.

The output of the OR gate 36 is connected to a counter or counting unit 37. The counter 37 has an output which, in turn, is connected to the input of a flip-flop 38.

The outputs of the comparator amplifiers 31, 31' and 31" are further connected to respective inputs of an AND gate 46. Likewise, the outputs of the comparator 32, 32' and 32" are further connected to respective inputs of a second AND gate 47. The output of the AND gate 46 is connected to one input of a computer 39 while the output of the AND gate 47 is connected to another input of the computer 39.

The computer 39 has an additional input which is connected with the output of the flip-flop 38. Still another input of the computer 39 is connected with the detector 23. The computer 39 further has an output which communicates with the counter 37 and the flip-flop 38. This output of the computer 39 serves to clear or reset the counter 37 as well as to reset the flip-flop 38.

The computer 39, which functions in a manner to be described below, is connected to and controls the motor 16 via a second output thereof. The computer 39 may, for instance, be constituted by a conventional microprocessor having suitable memories for the storage of data and commands.

The circuit illustrated in FIG. 3 operates as follows:

As the film strip 2 is continuously moved by the sensor 17, the latter generates a signal which indicates the transparency or density variations along the film strip 2. The signal emitted by the sensor 17 is linearly amplified by the amplifier 24. The amplified signal is then differentiated by the capacitor 26, that is, the first derivative of the amplified signal is formed. This yields a curve which indicates the transparency increases and decreases along the film strip 2. The curve is defined by differential values, that is, values which are a function of the transparency differences between neighboring regions of the film strip 2.

The differentiated signal may be considered to be composed of positive and negative components. The positive component represents an increase in transparency, or a decrease in density, from one region to the next. Similarly, the negative component represents a decrease in transparency, or an increase in density, from one region to the next.

The differentiated signal is amplified in the amplifier 27 and the amplified differential signal is then divided into its positive and negative components. One of these components is delivered to the comparator amplifier 31 while the other component is delivered to the comparator amplifier 32. By way of example, it is here assumed that the positive component is supplied to the amplifier 32 and the negative component is supplied to the amplifier 31.

The negative component is compared with a predetermined reference signal or voltage supplied by the potentiometer 34. The reference signal corresponds to a reference value which represents a significant transparency decrease. If the magnitude of the differential value corresponding to the negative component of the amplified differentiated signal exceeds the magnitude of the reference value corresponding to the signal from the potentiometer 34, the output of the comparator amplifier 31 transmits a signal to the OR gate 35. This signal represents a negative change value which is indicative of a significant transparency decrease from one region of the film strip 2 to the next.

In the same manner, the positive component of the amplified differentiated signal delivered to the comparator amplifier 32 is compared with a reference signal or voltage supplied by the potentiometer 33. The signal from the potentiometer 33 corresponds to a reference value which represents a significant transparency increase. If the magnitude of the differential value corresponding to the positive component of the amplified differentiated signal exceeds the magnitude of the reference value corresponding to the signal from the potentiometer 33, the output of the comparator amplifier 32 transmits a signal to the OR gate 35. This signal represents a positive change value which is indicative of a significant transparency increase from one region of the film strip 2 to the next.

The OR gate 35 transmits a signal to the OR gate 36 every time the OR gate 35 receives a signal from one of the comparator amplifiers 31 and 32. Thus, the OR gate 35 sends a signal to the OR gate 36 regardless of whether the signal received by the OR gate 35 is representative of a negative or a positive change value or, in other words, regardless of whether the signal received by the OR gate 35 is indicative of a transparency increase or a transparency decrease. The OR gate 36, in turn, sends a signal or pulse to the counter 37 each time a signal is received from the OR gate 35. Similarly, the OR gate 36 sends a pulse to the counter 37 whenever a signal is received from the OR gate 35' corresponding to the sensor 18 and whenever a signal is received from the OR gate 35" corresponding to the sensor 19. Like the signals emitted by the OR gate 35, the signals emitted by the OR gates 35' and 35" are indicative of significant transparency changes, that is, transparency changes having magnitudes which exceed the magnitudes of predetermined reference values. The pulses delivered to the counter 37 via any of the OR gates 35, 35' and 35" are independent of the pulses supplied to the counter 37 by the remaining ones of the OR gates 35, 35' and 35". In other words, each of the OR gates 35, 35' and 35" causes pulses to be delivered to the counter 37 independently of the other OR gates 35, 35' and 35".

It will be observed from FIG. 2 that the film strip 2 is scanned along three lines 17a, 18a and 19a which respectively correspond to the sensors 17-19. The scanning lines 17a-19a extend in the longitudinal direction of the film strip 2 and hence in the direction of movement 14 of the same. The scanning lines 17a-19a are parallel to one another and to the film strip 2 and are normal to the strip-shaped portions 2c of the film strip 2 and to those edges of the frames 2b defined by the strip-shaped portions 2c.

The counter 37 begins to count when the leading edge of a frame 2b passes by the sensors 17–19. The number of significant transparency changes which occur within the frame 2b are counted and this number is used as an indicator of the definition of the frame 2b, that is, the quality of the frame 2b for reproduction. When the number of significant transparency changes within the frame 2b reaches a predetermined value, the counter 37 determines that the frame 2b is sufficiently sharp to be reproduced. At this time, the flip-flop 38 is switched to a position in which it sends a signal to the computer 39 indicating that the frame 2b is to be copied or reproduced. When the trailing edge of the frame 2b reaches the sensors 17–19, that is, when the strip-shaped portion 2c trailing the frame 2b is recognized, the computer 39 delivers a resetting pulse to the counter 37 as well as the flip-flop 38.

The signals from the comparator amplifier 31 representing significant transparency decreases are further transmitted to one of the inputs of the AND gate 46. The signals from the corresponding comparator amplifiers 31' and 31" associated with the sensors 18 and 19 are likewise further transmitted to respective inputs of the AND gate 46. The AND gate 46 delivers a pulse to the computer 39 when a significant transparency decrease is detected by all of the sensors 17–19 simultaneously, i.e. when a significant transparency decrease is simultaneously detected at each of the scanning lines. In other words, the AND gate 46 delivers a pulse to the computer 39 when it receives signals representative of negative change values from all of the comparator amplifiers 31, 31' and 31" simultaneously. Inasmuch as the frames 2b are relatively dark or dense adjacent to their edges, this is a strong indicator that a transition region from a virtually completely transparent strip-shaped portion 2c to a frame 2b is in register with the sensors 17–19.

In like manner, the signals from the comparator amplifiers 32, 32' and 32" representative of significant transparency increases are delivered to the respective inputs of the AND gate 47. The AND gate 47 sends a pulse to the computer 39 when a significant transparency increase is detected by all of the sensors 17–19 simultaneously, i.e. when a significant transparency increase is simultaneously detected at each of the scanning lines. In other words, the AND gate 47 delivers a pulse to the computer 39 when signals indicative of significant transparency increases are generated by all of the comparator amplifiers 32, 32' and 32" simultaneously. This is a strong indicator that a transition region from a relatively dark or dense frame 2b to a virtually completely transparent strip-shaped portion 2c is aligned with the sensors 17–19.

The detector 23 provides the computer 39 with information on the distance travelled by the film strip 2. As an example, the computer 39 may be fed information on the distance travelled by the film strip 2 since the last time an edge of a frame 2b was detected. Generally, all of the frames 2b for a specific type of film strip 2 will have the same length as considered longitudinally of the film strip 2. Similarly, the widths of the strip-shaped portions 2c as considered in the longitudinal direction of the film strip 2 will be identical for a specific type of film strip 2. The computer 39 has a memory which stores the length of the frames 2b as well as the width of the strip-shaped portions 2c for the particular type of film strip 2 being processed. This enables the computer 39 to automatically determine whether a pulse received from the AND gate 46 or the AND gate 47 does, in fact, indicate the presence of an edge of a frame 2b. Thus, if the computer 39 receives a pulse from the AND gate 47 indicating a transparency increase, the computer 39 can determine whether this corresponds to the trailing edge of a frame 2b by comparing the known length of the frame 2b with the distance travelled by the film strip 2 since the previous detection of a transparency decrease, i.e. since detection of the leading edge of the frame 2b. Similarly, if the computer 39 receives a pulse from the AND gate 46 indicating a transparency decrease, the computer 39 is able to determine whether this corresponds to the leading edge of a frame 2b by comparing the known width of a strip-shaped portion 2c with the distance travelled by the film strip 2 since the last detection of a transparency increase, that is, since detection of the trailing edge of the preceding frame 2b.

When the computer 39 confirms that a pulse received from the AND gate 47 indicates the presence of a trailing edge of a frame 2b, the information obtained from the flip-flop 38 is evaluated. In other words, a determination is made as to whether the subject matter of the frame 2b has good definition, that is, as to whether the frame 2b is sharp. If the frame 2b which has just had its trailing edge detected is worth reproducing, the computer 39 directs the motor 16 to transport the frame 2b into the copying station or into a marking station, e.g. a station having a punch for forming a notch in the edge of the film strip 2 at a location corresponding to the frame 2b. Once scanning of the frame 2b has been completed, the computer 39 generates a pulse which resets the flip-flop 38 as well as the counter 37. Accordingly, scanning of the next frame 2b is initiated on the presumption that such frame 2b has poor definition.

If the flip-flop 38 is not switched by the counter 37 during scanning of a frame 2b, the latter is neither copied nor marked. The computer 39 directs the motor 16 to transport this frame 2b beyond the marking station and the copying station.

It will be appreciated that the sensors 17–19 as well as the associated circuit arrangements for processing the transparency values obtained from the sensors 17–19 serve two functions, namely, that of evaluating the quality of the frames 2b for reproduction and that of locating the frames 2b.

The motor 16 may be a stepping motor rather than a continuously running motor. In such an event, the motor 16 advances the film strip 2 in steps, e.g. steps having a length of 0.2 mm. each, during scanning and simultaneously serves to cause sensing of the film strip 2 in synchronism with advancement of the same. Discrete transparency values are then obtained and may be subtracted from one another to generate the differential values, e.g. by means of a sample-and-hold circuit. The differential values obtained in this manner may subsequently be processed via comparator amplifiers in the manner described above.

According to the invention, it is also possible to scan a frame 2b line-by-line and to store the results of the scan. Rectified, significant transparency changes occurring simultaneously at spaced locations of a reference line which extends normal to the longitudinal direction of the film strip 2 here, again, serve as an indicator for the presence of an edge of a frame 2b. As before, the indication provided by the transparency changes may be checked by measuring the distance of travel of the film strip 2.

In the illustrated embodiment, the frames 2b are scanned along three scanning lines 17a–19a by means of three sensors 17–19. It is nevertheless possible to use two sensors and to scan the frames 2b along two scanning lines. Similarly, it is possible to use more than three sensors and to scan the frames 2b along more than three scanning lines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

Transparency increases or decreases are to be considered as significant if they amount to more than 3 percent.

We claim:

1. A method of evaluating a series of originals prior to reproduction, each of said originals having a pair of substantially parallel edges, and said originals being arranged so that said edges extend in substantial parallelism with one another, said method comprising the steps of:
    (a) measuring the transparencies of a series of regions of each original along at least two scanning lines which extend transversely of said edges;
    (b) deriving change values representative of significant transparency differences between neighboring regions from the transparency values obtained during the measuring step, said change values including first change values derived from one of said scanning lines and second change values derived from the other of said scanning lines;
    (c) evaluating said change values to establish the quality of each original for reproduction; and
    (d) generating a signal when first and second change values are substantially simultaneously derived from respective locations of said scanning lines situated on a common reference line substantially paralleling said edges, said signal indicating a substantial probability of one of said edges being substantially in register with said reference line.

2. The method of claim 1, wherein said first and second change values are representative of transparency increases.

3. The method of claim 1, wherein said first and second change values are representative of transparency decreases.

4. The method of claim 1, wherein said originals are constituted by photographic film.

5. The method of claim 1, wherein said originals constitute discrete frames on a continuous web and neighboring originals are separated by strip-shaped portions of said web which extend in substantial parallelism with said edges.

6. The method of claim 1, wherein the size of each of said regions at least approximates the resolution of the respective original.

7. The method of claim 1, wherein the measuring step is performed photoelectrically.

8. The method of claim 1, wherein the deriving step comprises processing said transparency values to obtain differential values which are a function of the transparency differences between neighboring regions, and comparing said differential values with reference values to thereby generate said change values.

9. The method of claim 1, wherein the evaluating step comprises counting said change values.

10. The method of claim 1, wherein the evaluating step comprises determining the magnitudes of said change values.

11. The method of claim 1, wherein said scanning lines are substantially parallel to one another.

12. The method of claim 1, wherein said scanning lines are substantially normal to said edges.

13. The method of claim 1, comprising the step of establishing relative movement between said originals and said reference line longitudinally of said scanning lines.

14. The method of claim 13, wherein the step of establishing relative movement comprises conveying said originals.

15. The method of claim 13, further comprising the steps of measuring the relative distance of movement of said originals and said reference line during a predetermined time interval preceding the generating step; and comparing said relative distance with a reference length subsequent to the generating step to thereby check whether the generating step is indicative of one of said edges.

16. The method of claim 15, said originals having substantially the same predetermined length as considered longitudinally of said scanning lines; and wherein said predetermined time interval is the time interval between two consecutive generating steps and said reference length is said predetermined length.

17. The method of claim 15, all pairs of neighboring originals being spaced by substantially the same predetermined distance as considered longitudinally of said scanning lines; and wherin said predetermined time interval is the time interval between two consecutive generating steps and said reference length is said predetermined distance.

18. The method of claim 13, the measuring step and the step of establishing relative movement each being performed substantially continuously to thereby generate functions from said transparency values; and wherein the deriving step comprises differentiating said functions, and comparing the derivatives with reference values to thereby generate said change values.

19. The method of claim 1, said first and second change values respectively including first positive and second positive change values representative of transparency increases, and said first and second change values further respectively including first negative and second negative change values representative of transparency decreases; and wherein the generating step is performed only when first positive and second positive change values, or first negative and second negative change values, are substantially simultaneously derived from said locations.

20. An arrangement for evaluating a series of originals, particularly a series of frames on a web of photographic material, prior to reproduction, each of the originals having a pair of substantially parallel edges, and the originals being arranged so that all such edges extend in substantial parallelism with one another, said arrangement comprising:
    (a) transparency measuring means for measuring the transparencies of a series or regions of each original along at least two scanning lines which extend transversely of the aforesaid edges of the originals, said transparency measuring means including a first measuring device for one of the scanning lines and a second measuring device for the other of the scanning lines, and said measuring devices being located on a common reference line which substantially parallels the aforesaid edges of the originals;

(b) deriving means connected with said transparency measuring means and operative to convert the transparency values generated by the latter into change values representative of significant transparency differences between neighboring regions of the originals, said deriving means being designed to derive first change values from the transparency values generated by said first measuring device and second change values from the transparency values generated by said second measuring device;

(c) evaluating means connected with said deriving means and designed to evaluate the change values to thereby establish the quality of each original for reproduction; and (d) generating means connected with said deriving means and designed to generate a signal when first and second change values are substantially simultaneously derived from said first and second measuring devices, the signal indicating a substantial probability of one of the aforesaid edges being in substantial register with said reference line.

21. The arrangement of claim 20, comprising moving means for moving the originals and said transparency measuring means relative to one another longitudinally of the scanning lines.

22. The arrangement of claim 21, wherein said moving means is designed to convey the originals.

23. The arrangement of claim 21, comprising distance measuring means for measuring the relative distance of movement of the originals and said transparency measuring means during a predetermined time interval.

24. The arrangement of claim 23, comprising a control unit connected with said generating means and said distance measuring means, said control unit being designed to check whether a signal generated by said generating means is indicative of one of the aforesaid edges by comparing a reference length with the relative distance of movement of the originals and said transparency measuring means during a predetermined time interval preceding the signal.

25. The arrangement of claim 24, the originals having substantially the same predetermined length as considered longitudinally of the scanning lines; and wherein the predetermined time interval is the time interval between two consecutive signals and said reference length is the predetermined length.

26. The arrangement of claim 24, all pairs of neighboring originals being spaced by substantially the same predetermined distance as considered longitudinally of the scanning lines; and wherein the predetermined time interval is the time interval between two consecutive signals and said reference length is the predetermined distance.

27. The arrangement of claim 24, wherein said control unit comprises a computer having a memory and said reference length is stored in said memory.

28. The arrangement of claim 24, wherein said control unit is connected with said moving means and is designed to regulate movement of an original into a copying and/or a marking position when a comparison of said reference length with the relative distance of movement of the originals and said transparency measuring means verifies that an edge of the original is in substantial register with said reference line.

29. The arrangement of claim 20, wherein said deriving means comprises first means for generating differential values which are a function of the transparency differences between neighboring regions of the originals, and second means for comparing the differential values with reference values to thereby generate the change values.

30. The arrangement of claim 20, the first and second change values respectively including first positive and second positive change values representative of transparency increases, and the first and second change values further respectively including first negative and second negative change values representative of transparency decreases; and wherein said generating means comprises a first generating unit for generating a signal when first positive and second positive change values are substantially simultaneously derived from said first and second measuring devices, and a second generating unit for generating a signal when first negative and second negative change values are substantially simultaneously derived from said first and second measuring devices.

31. The arrangement of claim 20, wherein said deriving means comprises a first deriving unit for the first change values connected with said first measuring device, and a second deriving unit for the second change values connected with said second measuring device.

32. The arrangement of claim 31, each of said deriving units having a first branch for generating positive change values representative of transparency increases and a second branch for generating negative change values representative of transparency decreases; and wherein said generating means comprises a first AND gate having a plurality of inputs respectively connected with said first branches, and a second AND gate having a plurality of inputs respectively connected with said second branches, each of said gates having an output for emitting a signal.

33. The arrangement of claim 32, comprising moving means for moving the originals longitudinally of the scanning lines, distance measuring means for measuring the distance of movement of the originals during a predetermined time interval, and a control unit for controlling movement of the originals connected with said outputs and said distance measuring means.

34. The arrangement of claim 20, wherein said deriving means comprises differentiating means.

35. The arrangement of claim 34, wherein said differentiating means comprises a capacitor.

36. The arrangement of claim 20, comprising moving means for moving the originals longitudinally of the scanning lines, and a computer for controlling the movement of an original in dependence upon the quality thereof connected with said evaluating means and said generating means.

37. The arrangement of claim 36, comprising distance measuring means for measuring the distance of movement of the originals during a predetermined time interval, said distance measuring means being connected with said computer.

38. The arrangement of claim 20, wherein said evaluating means comprises an evaluating device for counting the change values.

39. The arrangement of claim 20, wherein said evaluating means comprises an evaluating device for evaluating the magnitudes of the change values.

40. A method of evaluating a series of originals prior to reproduction, said originals constituting discrete frames on a continuous web of photosensitive material, and neighboring originals being separated by strip-shaped portions of said web which extend in substantial parallelism with one another and define edges for said originals, said method comprising the steps of:
   (a) photoelectrically measuring the transparencies of a series of regions of each original along at least two scanning lines which are substantially normal to said strip-shaped portions and edges and substantially parallel to one another, each of said regions having a size which at least approximates the resolution of the respective original;
   (b) deriving change values representative of significant transparency differences between neighboring regions from the transparency values obtained during the measuring step, the deriving step including processing said transparency values to obtain differential values which are a function of the transparency differences between neighboring regions, and comparing said differential values with reference values to thereby generate said change values, said change values comprising first change values derived from one of said scanning lines and second change values derived from the other of said scanning lines;
   (c) evaluating said change values to establish the quality of each original for reproduction, the evaluating step including counting and/or determining the magnitudes of said change values; and
   (d) generating a signal when first and second change values are substantially simultaneously derived from respective locations of said scanning lines situated on a common reference line substantially paralleling said strip-shaped portions and edges, said signal indicating a substantial probability of one of said edges being substantially in register with said reference line.

41. An arrangement for evaluating a series of originals prior to reproduction, the originals constituting discrete frames on a continuous web of photosensitive material, and neighboring originals being separated by strip-shaped portions of the web which extend in substantial parallelism with one another and define edges for the originals, said arrangement comprising:
   (a) transparency measuring means for measuring the transparencies of a series of regions of each original along at least two scanning lines which are substantially normal to the aforesaid strip-shaped portions and edges and substantially parallel to one another, said transparency measuring means including a first photoelectric measuring device for one of the scanning lines, and a second photoelectric measuring device for the other of the scanning lines, and said measuring devices being located on a common reference line which substantially parallels the aforesaid edges of the originals, said measuring devices being designed to measure the transparencies of areas which at least approximate the resolutions of the originals;
   (b) deriving means connected with said transparency measuring means and operative to convert the transparency values generated by the latter into change values representative of significant transparency differences between neighboring regions of the originals, said deriving means including first means for generating differential values which are a function of the transparency differences between neighboring regions of the originals, and second means for comparing the differential values with reference values to thereby generate the change values, and said deriving means being designed to derive first change values from the transparency values generated by said first measuring device and second change values from the transparency values generated by said second measuring device;
   (c) evaluating means connected with said deriving means and operative to evaluate the change values to thereby establish the quality of each original for reproduction, said evaluating means being designed to count and/or determine the magnitudes of the change values; and
   (d) generating means connected with said deriving means and operative to generate a signal when first and second change values are substantially simultaneously derived from said first and second measuring devices, the signal indicating a substantial probability of one of the aforesaid edges being in substantial register with said reference line.

* * * * *